Patented Mar. 17, 1953

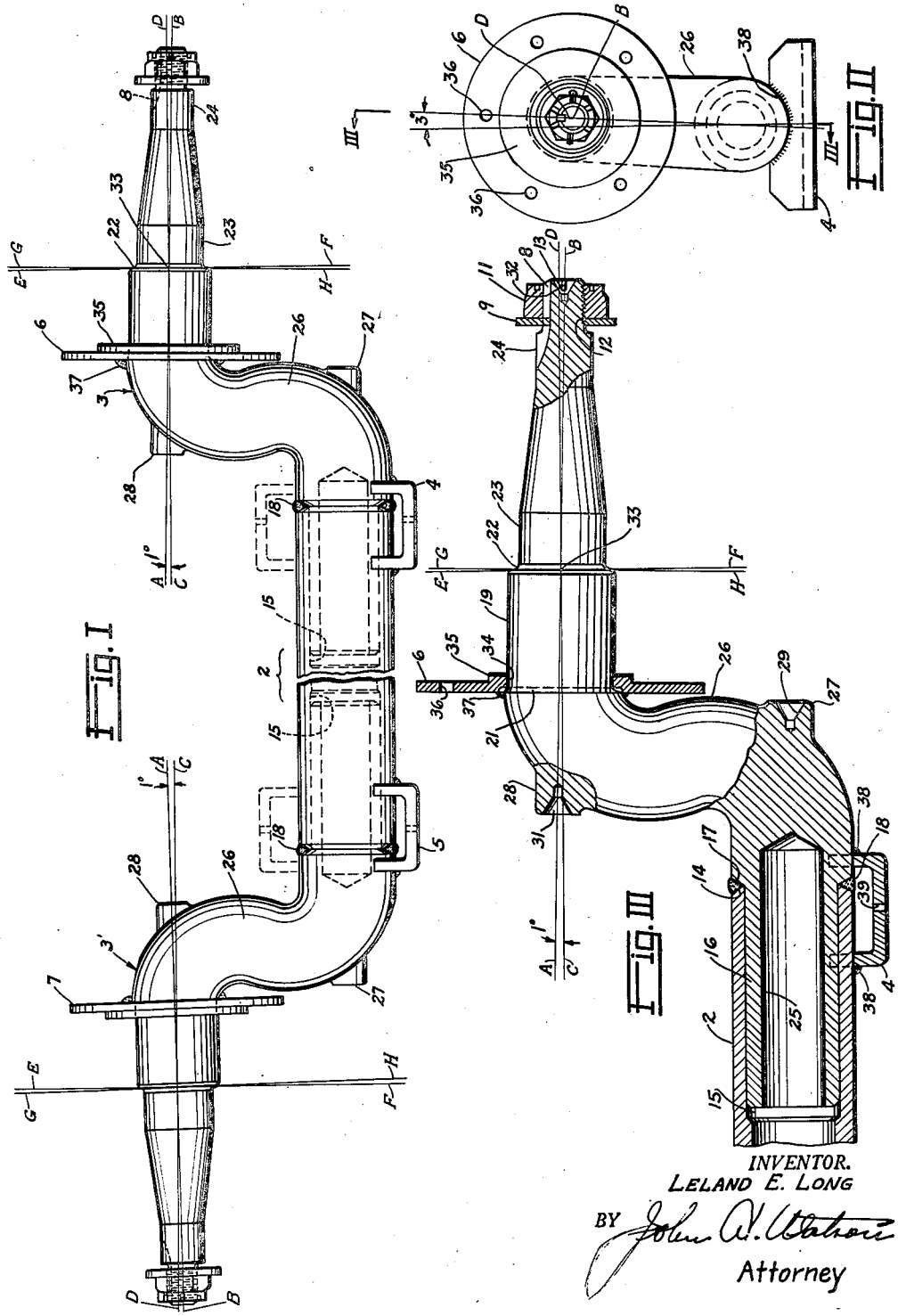

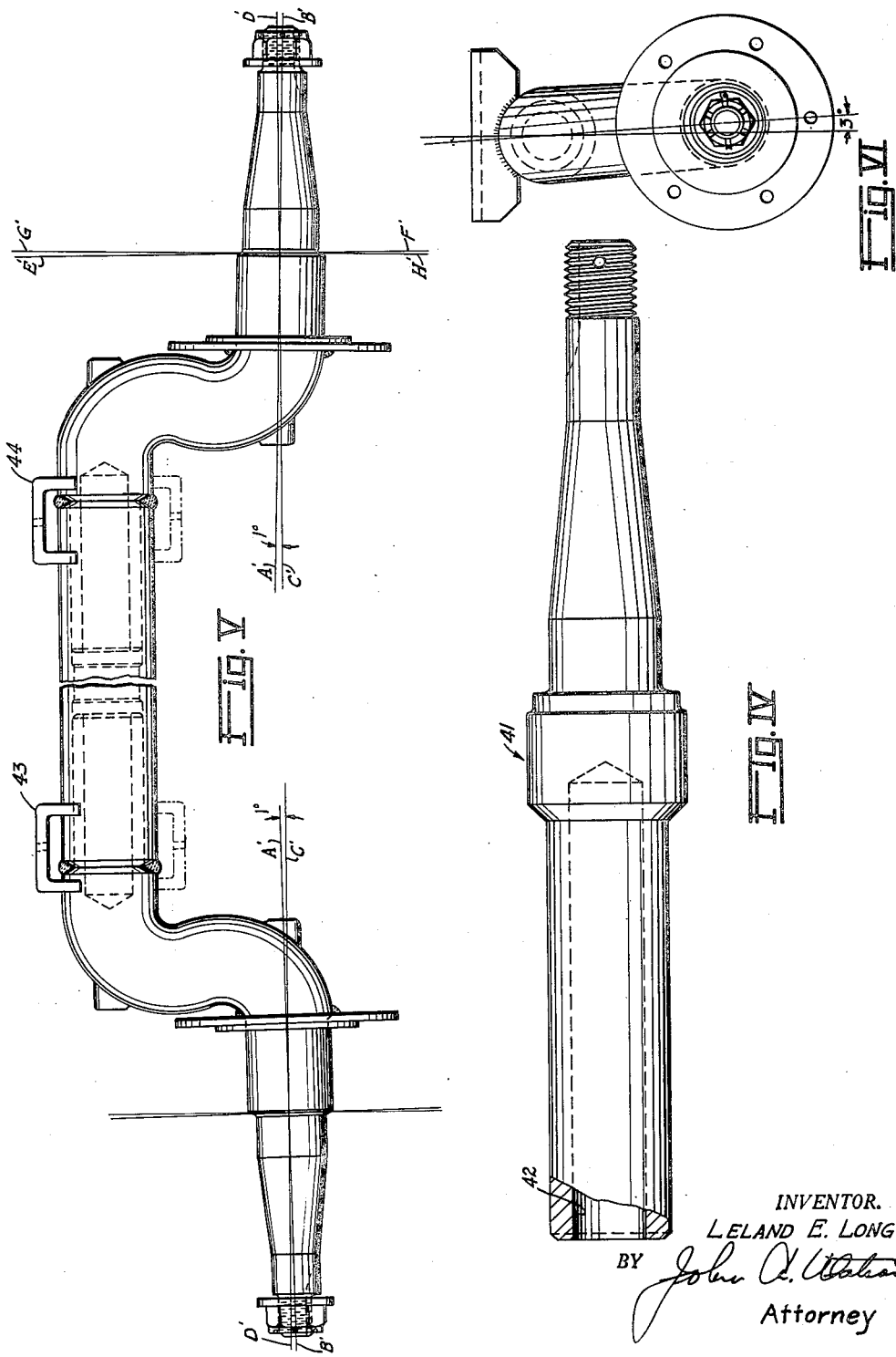

2,631,898

UNITED STATES PATENT OFFICE 2,631,898

AXLE AND METHOD OF MANUFACTURE

Leland E. Long, Dayton, Ohio, assignor to The Fayette Manufacturing Company, Fayette, Ohio, a corporation of Ohio Application March 27, 1946, Serial No. 657,440

10 Claims. (Cl. 301—127)

This invention pertains to the construction of axles and to a method of manufacture of axles for various types of vehicles although, as in the embodiment chosen for illustration herein, one of its most useful and desirable applications is in the field of semi-trailer and trailer manufacture. The invention may be applied to axles that are to be attached directly to a vehicle body without the intermediary of springs or it may be applied to axles to be connected through any spring suspension means. Furthermore, while the illustration herein shows an application of the invention to an axle carrying a wheel spindle at each of its opposite ends, the construction may be applied to an axle carrying one wheel only, for independently mounted wheels, or to an axle carrying two or dual wheels at one end. Other applications will become apparent as this disclosure proceeds.

One of the primary objects of the invention is to provide a vehicle axle which will be light in weight although having far greater strength for its weight than axles heretofore utilized for the purpose.

Another important object is to provide a construction and a method of construction whereby materially to facilitate and simplify the machining, handling and other operations required in manufacturing a vehicle axle of the character mentioned and in effecting assembly of the axle to and through a spring or other suspension to a vehicle chassis or directly to the chassis or body.

Still another important object is to provide a construction of such character that the wheel spindles, and therefore the wheels, may be given any desired camber, caster and toe-in at the time of manufacture of the axle without resorting to the usual bending and twisting operations on the axle which stress and strain the metal and weaken it to a serious and undesirable degree.

A still further object is to provide a construction whereby an axle may be assembled from easily manufactured parts and so that axle spindles of any particular dimensions may be utilized with other prefabricated axle parts of various dimensions as, for instance, different lengths of connecting members to meet usual or special requirements of vehicle track width, camber, caster, toe-in and so forth.

Many other objects as well as the uses and advantages of the invention will be or should become apparent and be understood upon study of the following description and claims and the accompanying drawings illustrating a preferred embodiment. In the drawings:

Fig. I is a view in front elevation of a drop-center axle for a trailer vehicle, the center portion of the axle being broken out and omitted for convenience of illustration.

Fig. II is a view in elevation of the right hand end of Fig. I.

Fig. III is a longitudinal view of the right hand end portion of the axle assembly shown in Fig. I, but on a larger scale, with portions sectioned on planes indicated by line III—III in Fig. II.

Fig. IV is a longitudinal view of a spindle for incorporation in a straight axle, and Figs. V and VI, respectively, are a view in front elevation and a view in end elevation of an axle similar to that shown in Fig. I, but prepared for application to a vehicle requiring greater body clearance from the road.

In the form and adaptation of the invention shown in Figs. I to III, the axle, as a unit, comprises a tubular center section generally designated 2 and a pair of spindle members generally designated 3 and 3' which are firmly and permanently secured to the center section in a manner and by a method hereinafter disclosed. Also relatively permanently secured to the axle are spring pads 4 and 5 and brake mounting flanges 6 and 7. The outer end part of each spindle member is slotted as at 8 to provide a keyway to receive a key nib on a washer 9 which, together with a castellated nut 11 threadedly engaged with threads 12 formed on the outer end part of each spindle member, serves to retain a wheel and its hub (neither shown) on such spindle member. A cotter-key hole is drilled through the threaded outer end part of the spindle member for reception of a cotter-key 13 by which the nut is held in adjusted position.

In the interests of simplification of reference terminology, and referring principally to Fig. III, each spindle member 3 in each of the drawing figures except Fig. IV may be considered as having four primary portions. First, there is a "shank portion" or "shank" designated 16 and comprising, in general, that portion of the spindle member between a boss designated 27 and the left-hand terminal end which is disposed within the tubular center section or member 2. Second, there is a transversely extending "crank arm portion" which is designated 26 and comprises, in general, that portion which extends from the shank portion or shank 16 to a "spindle arm portion" or "spindle arm" which extends to the right (Fig. III) of a boss 28. Third, the "spindle arm portion" or "spindle arm" may be considered as comprising, in general, all of that portion of a spindle member which extends outwardly (to the right in Fig. III) from the crank arm portion 26 to and including the threaded outer end part 12. Fourth, that particular part or portion of the spindle arm portion or spindle arm upon which the wheel bearings, wheel hub and wheel are to be mounted and which may be considered as comprising the thrust shoulder 22, the bearing surfaces 23 and 24 and the threaded outer end part 12, may be defined as the "wheel spindle" or "spindle part." Also included in the spindle arm or spindle arm portion and located between the spindle and the crank arm portion 26, is a "brake assembly supporting part" 19. It should be understood, however, that these definitions and terms are not to be understood as restricting the boundaries of the invention. Furthermore, the designated boundaries of the several portions described and here defined are more or less arbitrary nad artificial, as will be appreciated.

The tubular center section 2 of the axle preferably is formed from cold drawn steel tubing of the desired internal and external diameters and wall thickness and is cut off in the desired length. Each end of the tube is then bevelled or chamfered as shown at 14 for a purpose to be disclosed and is reamed or bored as at 15 for the reception of the reduced shank portion 16 of the spindle. Preferably the bevel 14 is on a 30° slant to mate with a corresponding bevel or chamfer 17, of the same angular degrees, formed at the inner end of a reduced cylindrical terminal part of the shank portion 16, between them to provide 60° V-shaped grooves extending circumferentially of the axle when the tubular member or center section and its spindle members are assembled. These circumferential grooves receive welding metal, indicated by the dotted lines 18, deposited circumferentially during a process of welding the tube and its spindles together.

The spindle members preferably are steel forgings each of which is machined to provide the reduced shank portion 16, a cylindrical brake-assembly supporting part 19 having a circumferentially extending bevelled shoulder 21, a circular thrust shoulder 22, cylindrical bearing surfaces 23 and 24 for the reception of radial bearings of a wheel hub, and the reduced and threaded outer end portion previously described. Each of the spindle shanks or shank portion 16 is drilled or bored as shown at 25 to a depth substantially exceeding the axial length of the reduced portion 16 thereby to increase the length over which deflection under load may take place and to prevent localization of bending or other stresses particularly at the line of abutment or weld between the tube and shank portions. However, the bore 25 should not extend to the area of juncture of the shank with the crank arm portion 26 where leverage forces are more effective than over more remote portions of the shank. In one form, not shown, the bore 25 may be tapered so that the wall thickness at the outer end is relatively thin say, $\frac{1}{16}''$ to $\frac{3}{32}''$, the inner end, adjacent to the crank arm portion, being about the same thickness as the normal wall thickness of the tube.

When the spindle members are being forged they are provided with integral bosses 27 and 28 of which boss 27 is drilled and countersunk as shown at 29 in Fig. III. Of course, it is preferable that the cylindrical exterior of the shank of the spindle member be machined before drilling bore 25 and to this end it is drilled and countersunk (not shown) on its axis and on the same axis as the drill bore and the countersink 29 in boss 27 for mounting between the centers of a machine tool. The outer end of the spindle arm portion and the boss 28 likewise are drilled and countersunk as shown at 31 and 32 on a predetermined axis designated A—B which, as will be seen, determines the camber of the spindle bearing surfaces and, therefore, the wheel camber.

In the embodiment illustrated the camber of the wheel bearing surfaces of the spindle portions is pre-set by the machining operations and not by bending or twisting the metal as in the ordinary practice. The centers 31 and 32 are set on the axis A—B which passes through the point of intersection 33 of the axis C—D of the spindle arm portion with a plane (indicated by the line E—F) which is perpendicular (normal) to an outboard extension of the axis of the spindle shank and which contains a horizontal line also passing through point 33 and diametrically opposite points on the surface of the thrust shoulder 22 such opposite points lying substantially in the plane of the inner end of the inner wheel bearing to be mounted on surface 23. However, while the axis C—D is parallel with the axis of the spindle shank, the axis A—B is displaced from the axis C—D by a predetermined camber angle which should not exceed 3° and preferably is about 1° measured in a plane containing the axis C—D and the axis of the shank. As the thrust shoulder 22, the bearing surfaces 23 and 24 and the threads 12 of the spindle are machined or formed concentrically about the axis A—B, the wheel to be mounted on the spindle will have a plane of rotation perpendicular to the axis A—B and parallel to a plane, indicated by the line G—H, passing through the center 33 and also perpendicular to the axis A—B, and the line of intersection of the plane G—H with the surface of the thrust shoulder 22 will be a circle. The inside race (not shown) of the inner wheel bearing abuts against and is positioned by the thrust shoulder 22, as will be understood.

After the spindle arm of a spindle member has been prepared as described, the circular brake mounting flange or disc 6 may be assembled in place. This flange or disc may be formed as a stamping and is provided with a central circular opening 34 adapted to receive the spindle portion or arm 3 or 3' with a close fit, and is provided with a series of holes 36 for bolts or studs by which the brake mechanism is attached. After being put in place the flange or disc is welded, as indicated at 37, to the spindle member shoulder 21, the weld preferably being effected completely about the circumference of the spindle arm although in practice it may be difficult to effect a good weld at the underside of the spindle member where the plate and the off-set 26 are closely juxtaposed. However, the omission of a weld over this small arc is relatively immaterial as more than adequate strength and rigidity is provided by the weld effected over the balance of the circumference. It is to be noted, of course, that the plane of the outer face of the mounting flange 6 should be disposed parallel to the plane G—H when finally fixed on the spindle. The spindles thus completed are ready for assembly with the tubular member 2 and, after attachment of the spring pads 4 and 5 may be considered to be ready for vehicle mounting.

When the ends of the tubular member 2 are bored or reamed the boring or reaming preferably is done in such manner as to provide an internal diameter slightly less than the outside diameter of the spindle shank portion 16. For example, in a preferred construction using cold drawn seamless steel tubing having an O. D. of 2⅛" and an I. D. of 1⅝" (wall thickness ¼"), the interior diameter may be reamed or bored to an I. D. of 1.632 inches minimum and 1.633 inches maximum while the spindle shank will be machined or ground to an external diameter of 1.634 inches minimum and 1.635 inches maximum, so that the spindle shank outside diameter will be not less than 0.001 inch nor more than 0.003 inch greater than the internal diameter of the bore in the tubular member. Preferably also, the spindle shank should be drilled or bored so that the wall thickness is substantially equal to the wall thickness of the tubular member or, as above indicated, the wall thickness may taper, increasing in thickness from the outer to the inner end.

In order then, to assemble spindle and tubular members the tube ends may be heated until the diameter of the bore exceeds the external diameter of the spindle shank or the spindle shank may be cooled as by liquid air until its external diameter is less than the diameter of the tube bore, or the assembly may be effected by both shrinking the shank and heating the tube end. It is desirable that the tube ends be heated no higher than about 500° F. which alone should be sufficient to permit the assembly to be effected and, as for shrinking, it should not be necessary to subject the spindle to temperatures lower than —50° F.; either of such operations alone should permit the parts to be assembled but resort may be had to both heating the tube and cooling the spindle member if desired or necessary. The fixture in which the assembly is accomplished should be adapted to hold the spindles in their proper positions of alignment and location with respect to one another and the tube, that is, with the axes of the tubular member and the spindle shank portions in alignment and the axes A—B of the spindle portions or arms 3, 3' lying in a single plane containing the axes of the tubular member and the shank portions, until the relative temperatures between the parts have substantially equalized, i. e. the time tight frictional interengagement has become effective. At this time, if the proper machining and boring limits have been maintained, the shrinkage of the tube or the expansion of the spindle shank, or both, will have brought the entire external surface of the shank into tight, intimate and practically cohesive contact with the corresponding or coextensive internal surface of the bore, the tube over such area being under stress from the expansion effort of the shank while the shank is under stress of compression from the shrinking effort of the tube. Actually the tube ends may assume an expanded condition by a very small fraction of measurement, but such expansion should not have stressed the tube metal beyond 50% of its elastic limit if the dimensions and processing given above have been maintained.

The wheels of the vehicle should also be given caster which is easily provided in the axle disclosed and during the process used in effecting assembly of the tubular center section, or member 2, the spindle members 3 and 3' and the spring pads 4 and 5. "Caster" as a term used herein refers to the displacement or cant of the wheel spindle or spindle arm axis to one side or the other of a vertical plane through the center of the connection by which the spindle or spindle arm and a wheel rotatably mounted on the spindle or spindle arm, is attached to the vehicle to support the load of the vehicle; in the embodiment illustrated and described herein the "caster" given to the spindle or spindle arm is "positive" in the sense that the center of the tread contact of a wheel mounted on the spindle arm with a level surface will lie rearward (relative to the normal direction of vehicle movement) of a vertical plane containing the axes of the shanks of the spindle members and, of course, under such conditions, a spindle arm axis over the major part of its length will also be disposed rearward of such vertical plane containing the shank axes. Either in the fixture in which the tube and the spindle members are assembled or in another suitable one, the parts are welded circumferentially as indicated at 18. Thereafter and either in the same or another fixture, the spring pads 4 and 5 are welded in place on the tube or on the spindle shank portion or to both across the weld 18 as shown in Figs. I, II, and III. In this connection it may be pointed out that in some constructions the pads 4 and 5 will be placed beneath the axle as shown in full lines and in other constructions the pads will be positioned on the upper side of the axle as shown in dotted lines in the same figures of the drawings.

The positions of the pads 4 and 5 are important as such positions are used to set the spindle and, therefore the wheel caster. Although in some instances it may be desirable to have as much as 5° of caster, it is deemed sufficient for most purposes to have not exceeding 3° of caster and such has been illustrated in Figs. II and VI. The tube and spindle members are set in the fixture so that a straight line over the shortest distance from the center point 33 on the axis A—B (or a point on the axis A—B mid-way of the bearing surface 23, if desired) of each spindle to a projection of the axis of the adjacent tubular member and spindle shank, will make an angle of 3° with a plane containing the axis of the tubular member and spindle shanks and normal to the plane of the outer (top or bottom) face of the adjacent one of the spring pads, when the pads are permanently secured on the axle with their outer faces in the same plane. In such positions the pads are firmly welded, as indicated at 38, to the axle. A spring centering hole 39 may be provided in each pad.

Since the camber was pre-set in the spindle arms, as above described, rearward displacement of the spindle arms (relative to the axis of the axle and the front of the vehicle) will point the outer ends of the spindle arm axes slightly forward as well as downward thereby providing an increment of toe-in angle or toe-in in the wheels. This is a desirable feature under ordinary circumstances but if it is desired to omit any toe-in the spindle members may be set in a suitable fixture and the spindle portions or arms machined to give the desired camber angle to the axis at the selected angle of caster, i. e. so that a vertical plane will contain the axes of both spindle arms or a vertical plane containing the axis of one spindle arm will be parallel to a vertical plane containing the axis of the tubular member and spindle shanks.

It will now be apparent that the axle described and its process of manufacture have valuable and important features among which are those of extremely light weight in proportion to strength, a very high safety factor, flexibility and simplicity of construction, and avoidance of stresses to the point of strain and weakening in providing the drop-center or "drop-spindle" and in securing camber, caster and/or toe-in. Furthermore the construction and method of manufacture of the axle permit the assembly of spindles of any particular or desired type or dimensions with precut tubes of any desired length to give a wheel track of any predetermined width and to effect other purposes.

In Figure IV, is shown a straight, forged and machined spindle 41 which may be used with a straight tube to make a straight axle. However, if it be desired to give such type of spindle any particular angle of caster, camber and/or toe-in, such may be provided by machining the spindle arm about an axis off-set from the axis of the shank to give caster, with such axis inclined outwardly and downwardly to give camber, and with such axis also inclined forwardly to give toe-in. Of course, the rough forged spindle member would be set in a special fixture or work-holder to effect such machining. Other than as indicated the spindle of Fig. IV and a tubular member will be constructed and assembled after the manner of the axle previously described.

There are instances where it is desirable to have a "drop-spindle" axle so that greater clearance beneath a vehicle may be provided. The axle shown in Figs. V and VI is of such type. This axle is constructed and assembled in a manner substantially identical to the axle of Figs. I, II, and III except that the camber and toe-in angles will be set in a reverse direction. This will be apparent by reference to the axes A'—B' and C'—D' which correspond, respectively, to the axes A—B and C—D, and to lines E'—F' and G'—H', representing planes which correspond respectively, to lines E—F and G—H. Spring seat pads 43 and 44 may be attached to this axle after the manner of seat pads 4 and 5 and either above, as shown in full lines, or below, as shown in dotted lines.

While the invention has been disclosed in preferred embodiments and in modified form it will be understood that numerous changes may be made and various modifications designed without departing from the invention spirit and scope of the appended claims.

I claim:

1. An axle of the character described comprising, a tubular steel member, a unitary forged steel spindle member having a wheel spindle portion at one end and a shank portion at the other end and an intermediate portion interconnecting and off-setting said spindle and shank portions from one another with the spindle portion and the shank portion extending generally in opposite directions, said shank portion having a part disposed within one end of the tubular member and rigidly secured against rotative and longitudinal displacement relative thereto, and a spring mounting pad rigidly secured relative to said spindle and tubular members and including a substantially flat spring-engaging surface fixed in circular angle position relative to the axes of said shank portion and spindle portion with a plane normal to such surface and containing the axis of the shank portion making an acute angle with a plane intersecting the plane of such surface and containing the axis of said shank portion and intersecting the axis of said spindle portion between the ends of the spindle portion.

2. A vehicle axle comprising, a tubular steel member and a pair of forged steel spindle members, one of said spindle members being connected to one and the other to the opposite end of said tubular member, each of said spindle members having a spindle portion at one end and a shank portion at the opposite end and an intermediate portion integrally connecting its spindle portion and shank portion, the spindle portions being off-set from their respectively associated shank portions in the same relative direction and extending in substantially opposite directions relative to one another, the shank portions having a common longitudinal axis, a spring mounting pad rigidly secured to each end of the axle adjacent to the ends of the tubular member and to the said shank portions, each said spring pad including a substantially flat spring-engaging surface with said surface fixed relative to the axes of its adjacent shank portion and spindle portion with a plane normal to the plane of the said pad surface and containing the axis of the adjacent shank portion making an acute angle with a second plane which is normal to the plane of such surface and which contains the axis of the adjacent spindle portion, the inner ends of the axes of said spindle portions being disposed generally rearward of the respective axes of the shank portions as respects the normal direction of motion of the vehicle carrying the axle, the axis of each spindle being inclined outwardly and downwardly at an acute angle to a horizontal plane whereby to give a camber angle.

3. An axle having built-in caster and camber comprising, a steel tube and a pair of pre-formed and forged steel wheel spindle members, there being one spindle member at each end of said tube, each of said spindle members comprising a wheel spindle arm portion and a shank portion, each spindle member shank portion having a substantially cylindrical outer surface frictionally engaged with a corresponding internal surface of one end of the said tube and being welded to said tube end circumferentially of the latter at such end, the axes of said spindle arm portions being pre-formed to bear corresponding predetermined camber and caster angle relations to the axes of said tube and respective shank portions and to one another, and a spring pad member adjacent to each end of the axle and rigidly secured thereto relative to the spindle members, each spring pad member having a subsantially flat spring mounting surface formed thereon and extending generally in substantially the same plane as the plane of the mounting surface of the other pad, the spindle axis of each spindle arm portion extending in a plane which is normal to the first said plane and which is spaced from and parallel to a plane normal to the first said plane and containing the axis of the adjacent shank portion.

4. In an axle comprising a steel tube and a pair of pre-formed and crank-shaped forged-steel wheel spindle members, there being one spindle member at each end of said tube, each of said spindle members comprising a pair of spaced arms and a connecting and spacing portion integral with the arms, one arm of each spindle member providing a wheel spindle arm portion and the other arm providing a shank arm portion for insertion in one end of the tube, each shank arm portion having a substantially cylindrical outer surface frictionally engaged with a corresponding internal surface of one end of the said tube and being welded to said tube end circumferentially of the latter, the axes of said spindle arm portions bearing corresponding predetermined camber, caster and toe-in angle relations to the axes of said tube and respective shank portions and to one another, and a spring pad member adjacent to each end of the axle and rigidly and permanently secured thereto relative to the spindle members, each spring pad member having a substantially flat spring mounting surface disposed generally in the same plane, the spindle axis of each spindle arm portion being so disposed with respect to said plane of the adjacent spring pad member that a plane which contains such spindle axis and is normal to the first said plane will intercept a plane which contains the axis of the shank portion of the same spindle member and which last said plane is normal to the first said plane.

5. An axle comprising, a steel tube and a pair of pre-formed and crank-shaped forged-steel wheel spindle members, there being one spindle member secured to each end of said tube, each of said spindle members comprising a pair of spaced arms extending generally in opposite directions and a connecting and spacing portion integral with the arms, one arm of each spindle member having a wheel spindle portion formed thereon and a shank portion formed on the other arm, each spindle member shank portion having a substantially cylindrical outer surface frictionally engaged with a corresponding internal surface of one end of said tube and being welded to said tube end substantially circumferentially of the tube at such end, the axes of said shank portions being substantially in alignment, each spindle arm portion being machined to provide a circumferentially extending bearing receiving surface thereabout, the axis of generation of said bearing surface being inclined at a predetermined angle to the axis of the shank portion of such spindle member, the opposite spindle bearing surface axis being correspondingly inclined from the same side of a vertical plane containing the axes of the shank portions, and a pair of spring mounting pads, said pads being rigidly secured to the axle in spaced relation to one another and adjacent to the ends of said tube, said spring mounting pads having spring positioning surfaces disposed in similar predetermined angular position circumferentially of the axle and in predetermined angular relation to the inclination of said bearing surface axes.

6. An axle comprising, a steel tube and a pair of pre-formed forged steel wheel spindle members, there being one spindle member secured to each end of said tube, each of said spindle members comprising a wheel spindle portion at one end and a shank portion at the other end, each spindle member shank portion having a substantially cylindrical outer surface fitted snugly within a corresponding end of said tube and being welded to said tube end substantially circumferentially of the tube at such end the axes of said shank portions being substantially in alignment, each spindle portion being machined to provide a circumferentially extending bearing receiving surface thereabout, the axis of generation of said bearing surface being inclined at a predetermined angle to the axis of the shank of such spindle member, and a pair of spaced spring mounting pads rigidly secured to the axle, each pad being welded to the tube, adjacent an end thereof, and to the corresponding spindle member outwardly of the end of the tube, said spring mounting pads having spring engaging surfaces disposed substantially in a common plane extending in predetermined angular position with respect to the plane common to the axes of said spindle and shank portions.

7. A vehicle axle comprising, a tubular steel member and a pair of forged steel spindle members, one of said spindle members being connected to one and the other to the opposite end of said tubular member, each of said spindle members having a spindle portion at one end and a shank portion at the opposite end and an intermediate portion integrally connecting its spindle and shank portions, the spindle portions being off-set from their respectively associated shank portions in the same direction, the shank portions having their longitudinal axes in substantially one plane the axes of said spindle portions being disposed at a caster angle within a range not substantially exceeding five degrees from the vertical in a direction generally rearward of the respective axes of the shank portions as respects the normal direction of motion of the vehicle carrying the axle, each said shank portion having a reduced part disposed within one end of said tubular member with substantially all of the external surface area of said reduced part in tight frictional contact with substantially all of the coextensive internal surface area of the tubular member, and a shoulder on said shank portion substantially abutting the said end of said tubular member, said members being welded together along the juncture of said shoulder and said end of the tubular member, and a U-shaped spring seat pad for and secured to each end of the tubular member, each said pad having a notch in each of its legs at the outer end thereof for seating on said axle with the pad adjacent to said welded juncture.

8. The method of manufacturing a vehicle axle having a pair of oppositely disposed wheel spindle members and a member rigidly connecting and spacing said spindle members whereby to provide a predetermined caster for the wheels to be mounted on the spindle members comprising, forming the spindle members as individual units separate from the connecting member and in crank-shape with one arm of the crank of each spindle member providing the wheel spindle part and the other arm forming a shank part adapted for connection with said connecting member, securing the said shank arm part of each spindle member to said connecting member with the spindle arm part axes making predetermined equal acute angles with respect to the axis of said connecting member and in the same rotated sense about the axis of the connecting member with respect to the normal direction of vehicle movement, and fixedly securing a vehicle body connection member to the structure so formed and in predetermined angular relation to the rotated angular position of the spindle arm part axes about the axis of said connecting member.

9. The method of manufacturing a vehicle axle having a pair of oppositely disposed wheel spindle members and a member rigidly connecting and spacing said spindle members whereby to provide predetermined camber for the wheels to be mounted on the spindle members, comprising, forming the spindle members as individual units separate from the connecting member and in crank-shape with one arm of the crank of each spindle member providing the wheel spindle part and the other arm forming a shank part adapted for connection with said connecting member, machining each spindle arm part to provide a wheel bearing surface substantially concentric to an axis of the spindle part, said axis having an inclination from parallelism with the axis of the shank arm part at an angle not substantially exceeding three degrees so measured, about a center located substantially at the intersection of said axis of the spindle part and a plane which is perpendicular thereto and passes through said spindle arm part substantially at the inner end of said bearing surface, that a continuation of said axis of the spindle part in space outwardly of the outer end of the spindle arm part will intercept a horizontal plane containing the axis of its associated shank arm part when the spindle member and the connecting member are assembled in predetermined relationship, securing the said shank arm part of each spindle member to said connecting member with the spindle arm part axes making predetermined equal angles with respect to the axis of said connecting member and in the same rotated sense about the axis of the connecting member with respect to the normal direction of vehicle movement, and fixedly securing a vehicle body connection member to the structure so formed and in said predetermined angular relation to the rotated angular positions of the spindle arm part axes about the axis of said connecting member.

10. The method of manufacturing a vehicle axle having a pair of oppositely disposed wheel spindle members and a member rigidly connecting and spacing said spindle members whereby to provide predetermined camber for the wheels to be mounted on the spindle members comprising, forming the spindle members as individual units separate from the connecting member and in crank-shape with one arm of the crank of each spindle member providing the wheel spindle part and the other arm forming a shank part adapted for connection with said connecting member, machining each spindle arm part to provide a wheel bearing surface and each shank arm part to provide means for registering it in predetermined relation to said connecting member, said machining being performed so that the wheel bearing surface of each spindle arm part is concentric to its axis and such axis of each spindle arm part is inclined from parallelism with the axis of its associated shank arm part at an angle not substantially exceeding three degrees so measured, about a center located substantially at the intersection of the axis of the spindle arm part and a plane perpendicular thereto and passing through the spindle arm part substantially at the inner end of said bearing surface, that a continuation of said axis of the spindle arm part in space outwardly of the outer end of the spindle arm part will intercept a horizontal plane containing the axis of its associated shank arm part when the spindle member and the connecting member are assembled in predetermined relationship, securing the said shank arm part of each spindle member to said connecting member with the spindle arm part axes making predetermined equal angles with respect to the axis of said connecting member and in the same rotated sense about the axis of the connecting member with respect to the normal direction of vehicle movement, and fixedly securing a vehicle body connection member to the structure so formed and in predetermined angular relation to the rotated angular position of the spindle arm part axes about the axis of said connecting member.

LELAND E. LONG.

REFERENCES CITED

The following references are of record in the file of this patent:

UNITED STATES PATENTS

| Number | Name | Date |
| --- | --- | --- |
| 380,344 | Paterson | Apr. 3, 1888 |
| 1,572,531 | Henkel | Feb. 9, 1926 |
| 1,642,502 | Krasberg | Sept. 13, 1927 |
| 1,899,347 | Mogford | Feb. 28, 1933 |
| 2,072,198 | Davis | Mar. 2, 1937 |
| 2,224,145 | Dugan et al. | Dec. 10, 1940 |
| 2,226,327 | Smesne | Dec. 24, 1940 |
| 2,267,339 | Paulsen | Dec. 23, 1941 |
| 2,349,373 | Pointer | May 23, 1944 |

FOREIGN PATENTS

| Number | Country | Date |
| --- | --- | --- |
| 15,862 | Great Britain | 1892 |
| 390,838 | Great Britain | Apr. 10, 1933 |

OTHER REFERENCES

Dyke's Automobile and Gasoline Engine Encyclopedia (The Goodheart-Willcox Company, Inc., Publishers 16th Edition, 1931), pages 906 and 907. (Copy in Div. 45.)